UNITED STATES PATENT OFFICE.

CHARLES B. MORGAN, OF OAKLAND, CALIFORNIA.

PROCESS OF TREATING IRON ORE.

No. 910,707.  Specification of Letters Patent.  Patented Jan. 26, 1909.

Application filed June 25, 1908. Serial No. 440,307.

*To all whom it may concern:*

Be it known that I, CHARLES B. MORGAN, a citizen of the United States, residing at Oakland, in the county of Alameda and State of California, have invented certain new and useful Improvements in Processes of Treating Iron Ore, of which the following is a specification.

This invention relates to the process of reducing iron ores into metallic iron and freeing the metallic iron from its attendant gangue or slag by means of a liquid carbonaceous substance injected into the melted ore charge, its object being mainly to enable the process of treating iron ore and the conversion thereof into metallic iron to be successfully carried out in such localities where solid carbon is not commercially available for the treatment of such ores.

The process of the present invention consists in charging into any type of an open hearth furnace a mixture of iron ore having intermixed therewith a suitable flux, and melting the material thus charged into the furnace to a fluid condition. After the charge has been melted to a fluid condition, a liquid carbonaceous substance, at a suitable temperature, is forced into the melted charge, so as to bring the carbon into intimate contact with the oxygen of the ore, for producing a quick reaction, by which the two combine, releasing the metallic iron from its attendant gangue or slag. The released metallic iron precipitates and, thereafter is treated in the usual manner. Any suitable liquid carbonaceous substance may be utilized as the reducing agent to be forced into the melted charge, but preference is given to the use of asphaltum.

By first melting the ore charge before reduction has taken place and then forcing into the melted material the liquid carbonaceous substance, the carbon is brought into intimate contact with the particles of the ore, which results in the carbon immediately combining with the oxygen in the ore and quickly releasing the metallic iron, causing the separation of the iron from its attendant gangue or slag.

I am aware that it is old in the art of manufacturing iron to form a slag layer upon the surface of an iron-bath, and reducing the iron from the slag by means of a reducing material forced into the slag layer resting on the surface of the iron bath, and I make no claim to such a process.

Having thus described the invention, what is claimed as new and desired to be protected by Letters Patent is:—

1. The process of reducing iron ore into metallic iron consisting in first melting the ore charge to a liquid state and introducing into the melted charge a sufficient amount of carbonaceous substance in a liquid state to effect a reduction of the iron.

2. The process of reducing iron ore into metallic iron consisting in introducing into a furnace a charge of iron ore and a suitable flux heating the furnace to convert the charge into a liquid state and introducing into the molten charge a sufficient amount of carbonaceous substance in a liquid state to effect the reduction of the iron.

In testimony whereof I have signed my name to this specification in the presence of two subscribing witnesses.

CHARLES B. MORGAN.

Witnesses:
 N. A. ACKER,
 D. B. RICHARDS.